United States Patent
von Malmborg et al.

(10) Patent No.: US 7,717,500 B2
(45) Date of Patent: May 18, 2010

(54) OPENING ROOF HATCH FOR A COLLAPSIBLE CAR ROOF

(75) Inventors: Johan von Malmborg, Västra Frölunda (SE); Ulla von Malmborg, Västra Frölunda (SE)

(73) Assignee: Von Malmborg Innovation AB, Solna (SE)

( * ) Notice: Subject to any disclaimer, the term of this patent is extended or adjusted under 35 U.S.C. 154(b) by 289 days.

(21) Appl. No.: 11/813,514

(22) PCT Filed: Feb. 2, 2006

(86) PCT No.: PCT/SE2006/000144

§ 371 (c)(1),
(2), (4) Date: Jul. 8, 2007

(87) PCT Pub. No.: WO2006/085810

PCT Pub. Date: Aug. 17, 2006

(65) Prior Publication Data

US 2009/0140554 A1 Jun. 4, 2009

(30) Foreign Application Priority Data

Feb. 14, 2005 (SE) .................................. 0500348

(51) Int. Cl.
*B60J 7/02* (2006.01)
(52) U.S. Cl. .................. 296/216.04; 296/222
(58) Field of Classification Search ............ 296/216.02, 296/216.04, 220.01, 222
See application file for complete search history.

(56) References Cited

U.S. PATENT DOCUMENTS

| 4,009,902 | A | * | 3/1977 | Yoxtheimer | 296/216.02 |
| 5,299,791 | A | | 4/1994 | Schlapp | |
| 5,542,735 | A | * | 8/1996 | Furst et al. | 296/107.18 |
| 6,669,278 | B2 | * | 12/2003 | Patelczyk et al. | 296/220.01 |
| 7,416,247 | B2 | * | 8/2008 | Dunneback et al. | 296/219 |
| 2002/0158491 | A1 | | 10/2002 | Patelczyk et al. | |

FOREIGN PATENT DOCUMENTS

| DE | 19950434 | * | 5/2001 | ............ 296/220.01 |
| DE | 10158742 A1 | | 6/2003 | |

OTHER PUBLICATIONS

International Search Report for corresponding International Application PCT/SE2006/000144.
International Preliminary Report on Patentability for corresponding International Application PCT/SE2006/000144.

* cited by examiner

*Primary Examiner*—Dennis H Pedder
(74) *Attorney, Agent, or Firm*—WRB-IP LLP

(57) ABSTRACT

A roof hatch for a collapsible or fixed vehicle roof includes panels which are displaceable away from an opening in the transverse direction of the vehicle. The panels are disposed in guides along the front and rear edges of the opening. The arching of the panels is adapted to follow the contours of the vehicle roof, seen from the sides of the vehicle. Where a collapsible roof is employed, extra storage space may be made available in the luggage compartment when the vehicle roof is in its collapsed position. The extra space is created in that light luggage is stored in the opening of the roof hatch when the panels are located in their open positions.

7 Claims, 3 Drawing Sheets

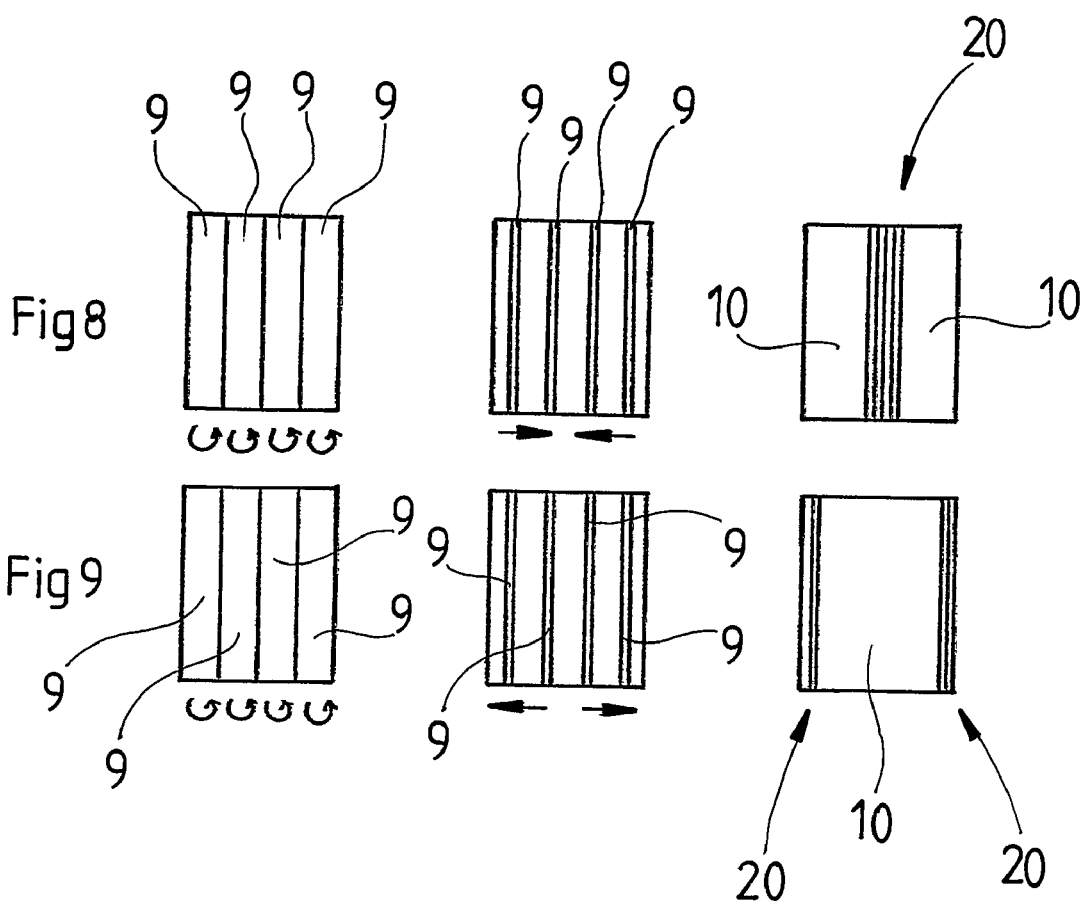
Fig 8
Fig 9
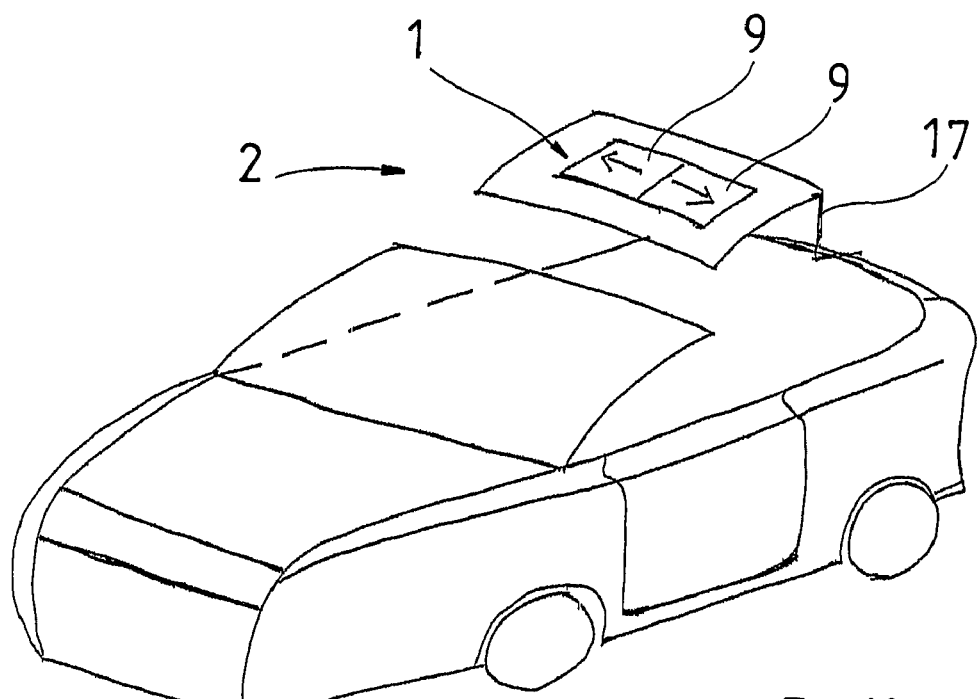
Fig 10

OPENING ROOF HATCH FOR A COLLAPSIBLE CAR ROOF

BACKGROUND AND SUMMARY

The present invention relates to an opening roof hatch for a collapsible car roof or a fixed car roof, comprising at least one movable panel displaceable from an opening.

In motor cars with a conventional roof hatch or so-called sun roof which is opened in a rearward direction towards the luggage compartment, the roof hatch is of planar design and presupposes that the vehicle has a substantially planar roof in order that the roof hatch be able to be opened to its full extent.

Vehicles of a sports car nature, such as convertibles or cabriolets with a collapsible or fixed car roof are often fitted with roofs that are arched about an axis transversely directed in relation to the longitudinal direction of the vehicle. The roofs on these cars are often short and split towards the rear window in order that these sections can be collapsed down into the luggage compartment by an angling in a pivot or joint between the luggage compartment and the roof.

Many vehicles of such type which have an arched roof that is short in the longitudinal direction of the car cannot employ a conventional flat roof hatch since a roof hatch of planar design which is opened in the longitudinal direction of the car would only achieve minimal opening for the roof hatch in its open position, since the arching of the roof obstructs the full opening of the roof hatch.

Further, a car roof hatch collapsed down into the luggage compartment takes up a considerable part of the load carrying area in the luggage compartment because of its bulky nature, which encroaches on the remaining available space when luggage is loaded.

It is desirable to design the roof hatch intimated by way of introduction so that it obviates the drawbacks inherent in prior art technology. Further, it is desirable to realise an opening roof hatch for vehicles whose roof design is relatively emphatically arched and which lacks substantially planar roof sections. It is desirable to realise extra storage space in the luggage compartment of vehicles with collapsible roofs.

In a roof hatch according to an aspect of the present invention the panel is movable in the transverse direction of the vehicle.

BRIEF DESCRIPTION OF THE ACCOMPANYING DRAWINGS

The present invention will now be described in greater detail hereinbelow, with reference to the accompanying Drawings. In the accompanying Drawings:

FIG. 1 s a top plan view of a vehicle with a roof hatch;

FIG. 8 shows a fifth embodiment of the subject matter of the present invention with a plurality of panels that are pivotal to substantially vertical position and movable towards the side sections of the opening for storage;

FIG. 9 shows one embodiment according to FIG. 8 in which the panels are movable towards the central area of the opening for storage; and FIG. 10 is a perspective view from above of a vehicle with a roof hatch and a pivot arm for collapsing the roof hatch into a luggage compartment.

DETAILED DESCRIPTION

In the description given below, use will be made of directional and positional indications such as forwards, rearwards, downwards, upwards, laterally etc. These indications relate to a roof hatch which is disposed on a vehicle roof mounted on a vehicle. In the Figures, arrows are provided which are intended to show the directions of movement of the panels for realising an open position of a roof hatch. Further, reference is made to the driver's and passenger's side, respectively, of the vehicle. This presupposes that the steering wheel of the vehicle is placed on the left-hand side.

Figure 1:
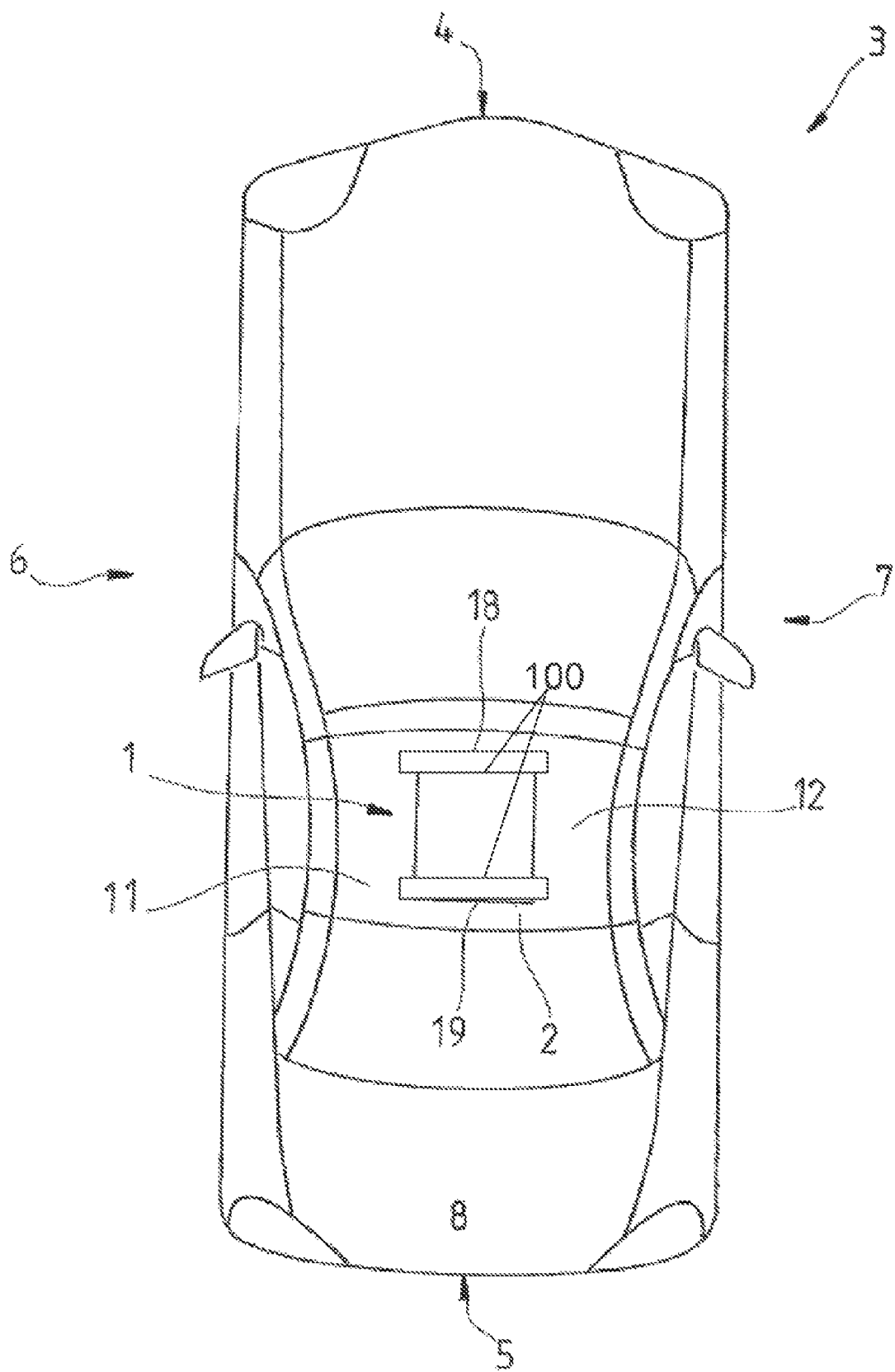

FIG. 1 shows a vehicle 3 seen from above, with a front section 4, a rear section 5, side sections 6 and 7 to the left and the right in the direction of travel of the vehicle, and a roof section 2 with a roof hatch 1. The vehicle is preferably a motor car with a collapsible or fixed vehicle roof 2. The collapsible vehicle roof 2 is advantageously collapsible down into a luggage compartment 8.

The vehicle roof 2 and its associated roof hatch 1 may be produced from materials such as sheet metal, glass, plastic or composite materials, as well as combinations thereof. The vehicle roof 2 with the roof hatch 1 may be factory fitted on a new vehicle, but may also be available as an accessory and be retrofitted on already existing vehicles at the end-customer.

The roof hatch 1 includes at least one movable panel 9 which may be displaced from an opening 10. The panel 9 is movable in the transverse direction of the vehicle 3 on opening and closing of the opening 10 of the roof hatch 1. Depending on the positioning of the panels 9, the roof hatch 1 has one or more openings 10. The panel 9 is accommodated in guides 100 along the front and rear edges 18 and 19 of the opening 10. The guides assist the lateral displacement of the panel 9 and may consist of guide rails, linkage systems, hydraulic systems, pneumatic systems or combinations thereof.

The panel 9 displays an arching which corresponds with the radii of curvature of the vehicle roof 2 and is adapted to follow the contours of the vehicle roof 2 when the vehicle 3 is observed from one side 6 or 7. This entails that it is possible to maintain the sporty exterior of the vehicle 3. The arching curves preferably about an axis which is transversely directed in relation to the longitudinal direction of the vehicle 3.

Figure 2:
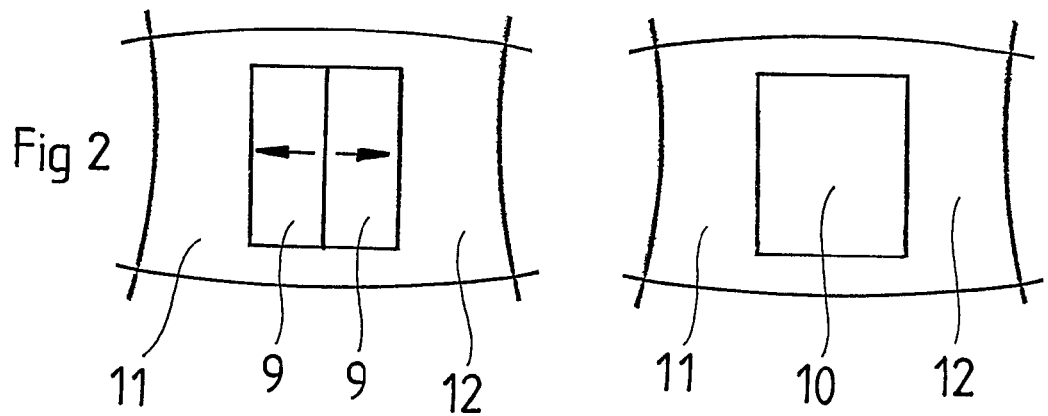
FIG. 2 shows a first embodiment of the subject matter of the present invention with a vehicle roof with roof hatch, the roof hatch having panels that are movable towards the side sections of the vehicle for storage under roof sections.
Figure 3:
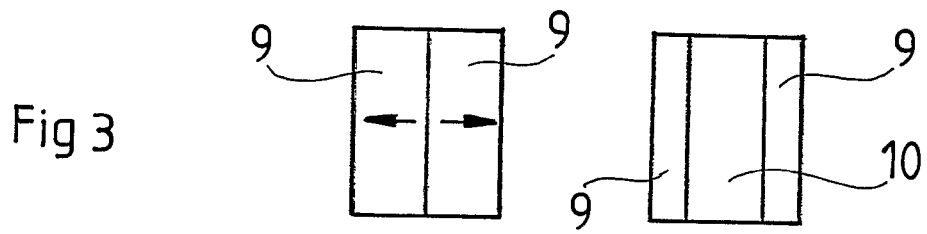
FIG. 3 shows one embodiment according to FIG. 2 with panels that are movable towards the side sections of the vehicle for partial storage under the roof sections.

FIGS. 2 and 3 show a first embodiment of the subject matter of the present invention, which comprises two panels 9 that are movable away from one another to an open position which is shown to the right in the Figures. In the open position of the panels 9 in FIG. 2, the panels 9 are preferably completely stored under the side sections 11, 12 of the vehicle roof. The panels 9 may also be partly stored under the side sections 11, 12 of the vehicle roof 2 as shown in FIG. 3.

Figure 4:
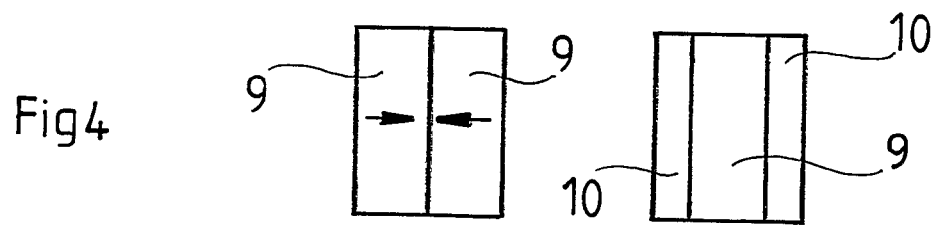
FIG. 4 shows a second embodiment of the subject matter of the present invention with panels that are movable towards the central area of the opening for storage.
Figure 5:
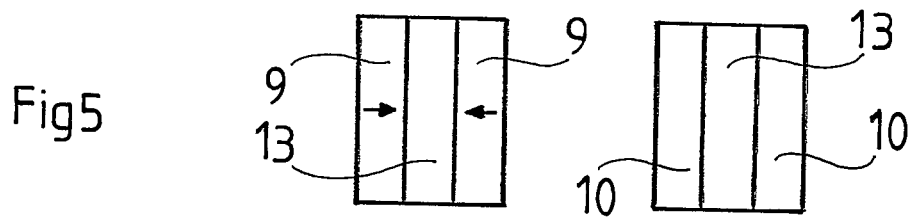
FIG. 5 shows one embodiment according to FIG. 4 with panels that are movable towards the central section of the vehicle for storage under a roof section.

FIGS. 4 and 5 show a second embodiment of the subject matter of the present invention comprising two panels 9 that are movable towards one another to open position. In the open position of the panels in FIG. 4, the panels are stored superposed over one another in the central area of the opening 10. The panels 9 may also be stored superposed over one another under a fixed central section 13 in the vehicle roof 2, as shown in FIG. 5. In that case where the vehicle roof 2 has a fixed central section 13, the roof hatch 1 has an opening 10 on each side of this section.

Figure 6:
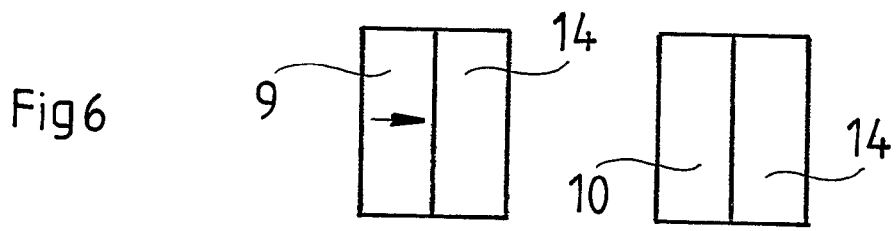
FIG. 6 shows a third embodiment of the subject matter of the present invention with a panel that is movable in over the passenger's side for storage.
Figure 7:
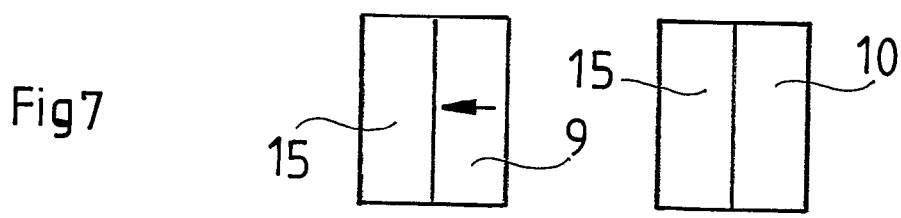
FIG. 7 shows a fourth embodiment of the subject matter of the present invention with a panel that is movable in over the driver's side for storage.

FIGS. 6 and 7 show a third embodiment of the subject matter of the present invention comprising a panel 9 that, in a closed position, is disposed over the driver's side or passenger's side of the vehicle 3. The panel is movable towards the passenger's side or the driver's side, respectively, to an open position, in which event the panel is, in its open position, stored under a roof section 14, 15 above the passenger's side or the driver's side.

FIGS. 8 and 9 show a fourth embodiment of the subject matter of the present invention comprising at least two panels 9. The panels 9 are pivotal about axes which are disposed in the longitudinal direction of the car which are shown to the right in FIGS. 8 and 9. The panels 9 are pivotal to positions 16 which are substantially vertical, whereafter the panels 9 may be moved away from the opening 10. To the right in FIG. 8, it is shown how the panels 9 are moved to the central area of the opening 10 for storage. To the right in FIG. 9, it is shown how a first half of the panels is moved to the left-hand side of the opening 10 and the second half towards the right-hand side of the opening 10 for storage.

The opening 10 exposed in the roof hatch 1 in the open position is preferably of an extent that is longer in the longitudinal direction of the vehicle 3 than in the lateral direction of the vehicle 3. Advantageously, the opening 10 may also extend over the front seats of the vehicle and over to the rear seats of the vehicle.

The width of the opening 10 is preferably at most as wide as half of the width of the roof 2 in the first, second and third embodiments. The panel or panels 9 must be able to be moved right out to the edges of the vehicle roof 2 and create a relatively large opening 10, the panels 9 being stored on one side or both sides of the opening 10.

The width of the opening 10 is preferably at most as wide as the width of the roof 2 in the fourth embodiment.

The roof hatch 1 according to the first, second and third embodiments has a vertical or height adjustment mechanism (not shown) which realises displacement movements of the panels 9 in the transverse direction of the vehicle 3 as well as from above and downwards, on opening of the roof hatch 1, and also from beneath and upwards on closing of the roof hatch 1.

The height adjustment mechanism realises movements, preferably in several level stages, of the panels 9 so that they may be moved from a closed position flush with the outer contour of the vehicle roof 2, to an open position in under the coupe roof. In the open position, the panels 9 may be lowered under the vehicle roof 2 as described above, or superposed and inserted under each other.

The roof hatch 1 according to the fourth embodiment has a height adjustment mechanism which, once the panels 9 have been moved together at the sides of the opening 10 or the central area, lowers the grouped panel package 20 which is shown to the right in FIGS. 8 and 9, to a level below the outer contour of the vehicle roof 2 in order to alleviate the effects of turbulence on the upper surface of the roof which is caused by slipstream.

On lowering or collapsing of the vehicle roof 2 and its roof hatch 1 into the luggage compartment 8, for example with the aid of a pivot arm 17 which is shown in FIG. 10, extra space may be made available in the luggage compartment 8 for storing luggage. The extra space is made available between an upper section on which the roof hatch 1 is disposed and a lower section which preferably comprises the rear screen of the vehicle 3 or alternatively a floor in the luggage compartment of the vehicle, in that case when the vehicle roof 2 comprises two sections. The extra space will be available when the panels 9 of the roof hatch 1 are opened, in which event light luggage may be stowed in the opening 10 of the roof hatch 1 in order to rest against the lower section.

Opening of the panels 9, operation of the height adjustment mechanism as well as collapsing of the vehicle roof into the luggage compartment may be put into effect manually, electrically, by remote control, etc.

What is claimed is:

1. An opening roof hatch for a vehicle roof comprising two movable panels adapted to be displaced from a closed position in an opening in the vehicle roof to an open position, each panel being movable in a transverse direction of the vehicle and being guided in guides along front and rear edges of the opening, wherein, in the open position, the panels are at least partly stored under a side section of the vehicle roof and leave a central opening between the panels.

2. The roof hatch as claimed in claim 1, wherein the vehicle roof and a roof hatch of the vehicle roof are collapsible into a luggage compartment of the vehicle with the roof hatch in open position.

3. The roof hatch as claimed in claim 1, wherein the opening is of an extent that is longer in a longitudinal direction of the vehicle than in the transverse direction of the vehicle.

4. The roof hatch as claimed in claim 1, wherein the panel is slidably movable in the transverse direction of the vehicle in the guides along the front and rear edges of the opening.

5. An opening roof hatch for a vehicle roof comprising two movable panels adapted to be displaced from a closed position in an opening in the vehicle roof to an open position, each panel being movable horizontally in a transverse direction of the vehicle, wherein, in the open position, the panels are at least partly stored under a side section of the vehicle roof and leave a central opening between the panels.

6. The roof hatch as claimed in claim 5, wherein the vehicle roof and a roof hatch of the vehicle roof are collapsible into a luggage compartment of the vehicle with the roof hatch in open position.

7. The roof hatch as claimed in claim 5, wherein the opening is of an extent that is longer in a longitudinal direction of the vehicle than in the transverse direction of the vehicle.

* * * * *